Dec. 20, 1966    J. BELART    3,292,371
MASTER CYLINDER AND BRAKE SYSTEM INCORPORATING SAME
Filed July 9, 1963
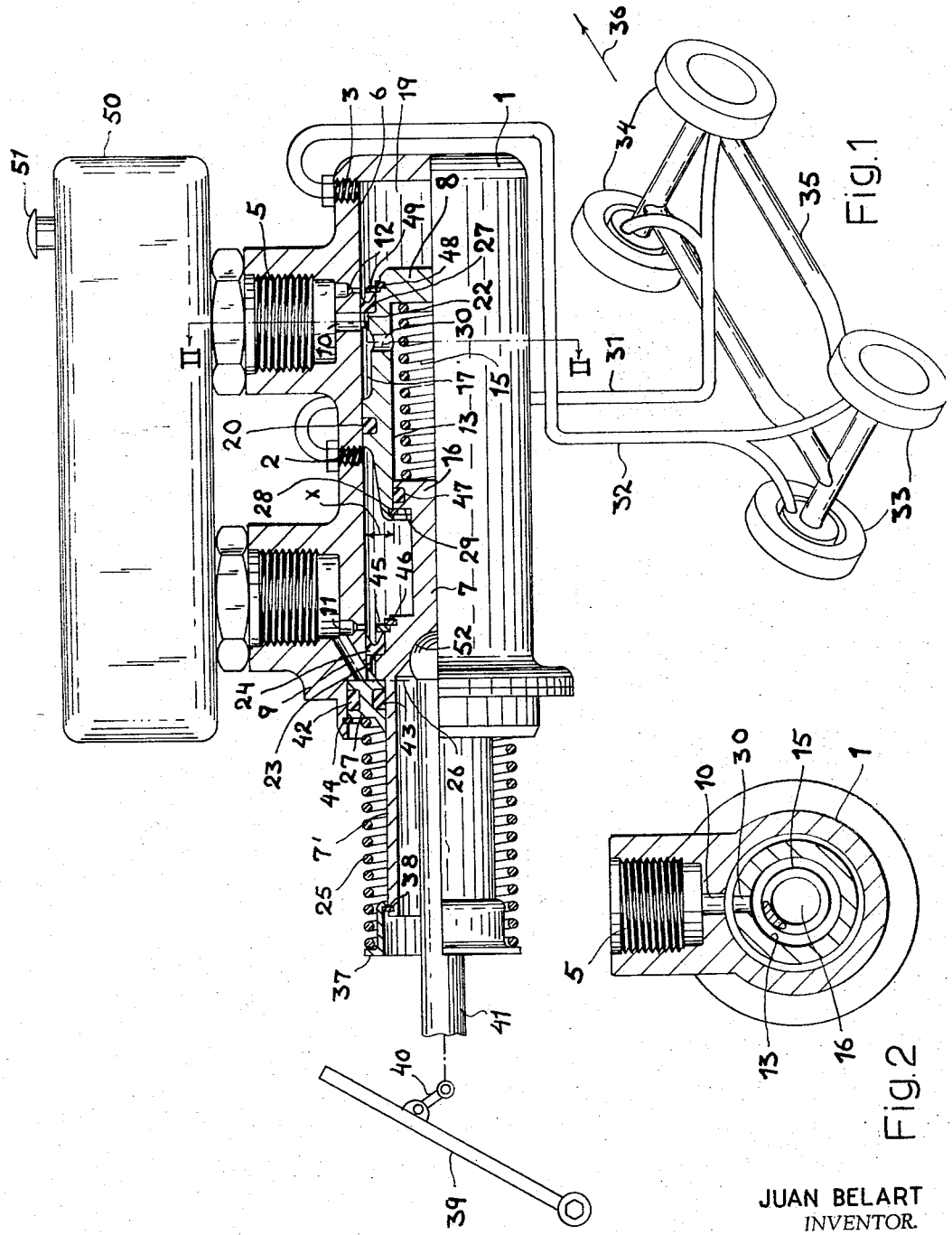
JUAN BELART
INVENTOR.
BY *Mestern, Ross & Mestern*

United States Patent Office 3,292,371
Patented Dec. 20, 1966

3,292,371
MASTER CYLINDER AND BRAKE SYSTEM
INCORPORATING SAME
Juan Belart, Walldorf, Hesse, Germany, assignor to
Alfred Teves Maschinen- und Armaturenfabrik, KG.,
Frankfurt am Main, Germany, a corporation of Germany
Filed July 9, 1963, Ser. No. 293,817
Claims priority, application Germany, July 14, 1962,
T 22,471
13 Claims. (Cl. 60—54.5)

My present invention relates to tandem-operating vehicular brake systems and, more particularly, to an improved master cylinder and a system incorporating same.

In earlier vehicular brake systems, the front-wheel and rear-wheel brake means were generally supplied with fluid under presusre from a so-called "master" cylinder in which an actuating piston was displaceable (e.g. by means of a brake pedal) for forcing fluid into the individual brake cylinders. Most known hydraulic brakes are of this general nature. More recently, however, it has become the practice to subdivide the brake systems into two independently operable portions, one for controlling the rear-wheel brakes and the other for controlling the front-wheel brakes. Systems of this type provide an added measure of safety in that, for example, a fluid leakage in the lines serving one of the brake means will not adversely affect the operation of the other brake means; additionally, it is desirable that, in automotive vehicles, the rear brakes should be applied somewhat before the front brakes to avoid danger of overturning and loss of steering control but yet the braking pressure on the front wheels should exceed that applied to the rear wheels. Such a loss of control results when the front wheels become locked before braking at the rear wheels takes effect. It has, therefore, been proposed to provide automotive vehicles with rear-wheel brakes of the relatively slow-acting drum type and front wheel brakes of the fast-acting disk type and to pressurize the fluid supplied to the rear-wheel brakes in advance of the operation of the front-wheel brakes via the master-cylinder. Some earlier systems have, therefore, been provided with a pair of pistons for forcing fluid to the respective brake means and mechanisms for actuating them successively, such mechanisms frequently including a lost-motion linkage. These earlier arrangements had, however, the important disadvantage that the master cylinder had to be exceptionally long, unwieldy, and difficult to mount in an automotive vehicle. In addition, the mechanisms employed for operating the two pistons were inordinately complex, unreliable and prone to failure.

It is, therefore, an important object of the present invention to provide a master cylinder wherein these disadvantages can be avoided.

More specifically, it is an object of my invention to provide a dual master cylinder for a vehicular brake system which can be made much more compact than earlier devices of this type, is relatively simple and thus not as prone to failure as formerly proposed devices, and which is characterized overall by a highly improved performance, efficiency and reliability in actuating the brake means.

According to a feature of the present invention, a dual master cylinder adapted to be incorporated into a two-network vehicular brake sygstem, comprises housing means forming a generally cylindrical bore and a pair of telescoping pistons reciprocable within this bore, one of these pistons being mechanically actuable by, for example, the usual brake pedal while the other is a floating piston displaceable relatively to the actuating piston. This telescoping arrangement, in addition to providing means for guiding the two pistons relative to one another, ensures a reduction in the overall length of the system and, according to a specific feature of this invention, makes it possible that the actuating piston will have a relatively small effective fluid-pressurizing surface while the floating piston is formed with a relatively large effective fluid-pressurizing surface within a bore of, say, uniform cross-section, first and second outlets (communicating with, for example, the front-wheel brake means and the rear-wheel brake means) being provided ahead of the effective surfaces of the actuating and floating pistons. Advantageously, preloaded resilient means is interposed between the two pistons so as to restrict their relative displacement until the biasing force of this resilient means is overcome by the actuating pressure. Preferably, the floating piston forms with the actuating piston a compartment, with which the aforementioned first outlet communicates, of substantially constant volume during concurrent displacement of the pistons but compressible upon the relative displacement against the force of the resilient means. It will be apparent that, when braking pressure is mechanically applied to the actuating piston, the two pistons can be shifted jointly within the cylinder bore to force fluid into the second outlet and, therefore, the rear-wheel brake means prior to any reduction in volume of this compartment. When, however, the resistance to further displacement of the floating piston exceeds the biasing force of the resilient means, a relative displacement between the two pistons ensues and fluid is forced under pressure to the front-wheel brake means via this compartment. By virtue of the difference in effective surface area mentioned above, the pressure applied to the front-wheel brake means can exceed that supplied to the rear-wheel brake means so that the front brakes, although actuated with a slight delay, have applied to them the greater braking pressure.

According to another feature of this invention, the two pistons form between them a chamber of variable volume, one of the pistons being provided with a passage communicating between this chamber and the exterior of the housing means. Advantageously, this passage can connect with the brake-fluid-storage reservoir whose inlets supply the cylinder bore in the usual manner. To this end, the piston provided with the passage is preferably formed with axially spaced annular sealing means defining between them an annular compartment within the bore, the housing means being provided with a suitable opening communicating between this latter compartment and the storage reservoir. The prestressed resilient means can include a compression spring received in the chamber formed between the pistons and bearing thereagainst, the pistons being provided with interengageable abutment means defining their limit of extension and maintaining the compression spring in a prestressed state.

The above and other objects, features and advantages of the present invention will become more readily apparent from the following description, reference being made to the appended drawing in which:

FIG. 1 is a diagrammatic view of a vehicular brake system embodying the present invention, with the master cylinder thereof shown partially in axial cross-section; and FIG. 2 is a cross-sectional view taken along the line II—II of FIG. 1.

In the drawing I show a cylinder housing 1 whose generally cylindrical bore 6 is formed with an outlet 2 from the master cylinder, this outlet communicating with the front wheel brakes 34 of the diagrammatically illustrated motor vehicle 35 via a first conduit means 31. A second outlet 3 in housing 1 communicates with the rear-wheel brakes 33 via second conduit means 32. The master-cylinder housing 1 is surmounted by a reservoir 50 for the brake fluid, this reservoir communicates with the cylinder bore 6 via tubular bosses 4 and 5, the reservoir 50 having a vented filling cap 51 in the usual manner. The cylinder bore 6 receives an actuating piston 7 having a tubular portion 7' forming a knuckle 52 for an actuating rod 41 which is coupled with a brake pedal 39 via the usual link 40. A smaller head 16 of actuating 7 is telescopingly received within a floating piston 8, also reciprocable within bore 6, and defines with this piston a chamber 13 of variable volume. Inlet bores 9 and 10 communicate between the reservoir 50 and central bore 6 rearwardly of the effective surfaces of pistons 7 and 8. Equalizing inlets 11 and 12 open into bore 6 ahead of the pistons 7, 8 and are adapted to be blocked thereby.

Within the chamber 14 formed in floating piston 8 by the central bore 13, a preloaded compression spring 15 bears upon these pistons in a sense tending to urge them apart and expand the chamber 14. A sealing ring 47 is recessed in the minor head 16 of piston 7 in liquid-light engagement with the wall 13 of the chamber 14. Floating piston 8 is also provided with a pair of sealing rings 20, 21 which are axially spaced apart and define between an annular compartment 7 which communicates with chamber 14 via a radial passage 30, this chamber 17 opening into the reservoir 50 via inlet 10. It will be apparent, therefore, that compartment 17 and chamber 14 are maintained at a fluid pressure below that within the working chambers 18, 19 of piston 7 and 8, respectively. Axial bores 22, 23 in the major head 7" of piston 7 and in piston 8 ensure that a pressure differential will be maintained across the flange- or lip-type seals 21 and 24 engaging the wall of bore 6. Rings 21 and 24 are retained by annular disks 45, 49, respectively, held in place by snap rings 46 and 48 receivable in pistons 7 and 8. A helical restoring spring 25, surrounding the tubular portion 7' of piston 7, bears axially upon a collar 37 affixed to tubular portion 7' by a split ring 38 and an end member 27 seated within the cylinder housing 1 by a snap ring 44. The end member 27 is provided with seals 42, 43 to prevent the escape of brake fluid and forms an abutment for the rear face 26 of the major head 7" of piston 7. Similarly, floating piston 8 is provided with a split-ring abutment 28 against which the rear face of minor head 16 is brought to rest to maintain spring 15 in its prestressed state. It will be apparent that the effective annular surface area of actuating piston 7 within chamber 18 will have the width x (FIG. 1) while that of piston 8 has the diameter of bore 6 as a consequence of the fact that substantially no fluid pressure is sustained within chamber 14.

Prior to actuation, the master cylinder is in the position shown in FIG. 1 with inlet apertures 11 and 12 unblocked. When brake pedal 39 is depressed, rod 41 is shifted to the right to displace actuating piston 7 in this direction. The prestressed spring 15 exerts a force identical to the actuating force upon floating piston 8 so that this piston too moves to the right. Ports 11 and 12 are thus blocked while chamber 19 is reduced in volume to force fluid under pressure to the rear-wheel brakes 33 via conduit 32, the volume of chamber 18 remaining unchanged during this initial stage of actuation. After the rear-wheel brakes take hold, the pressure builds up rapidly in chamber 19 so that further displacement of pedal 39 will result in a compression of spring 15 to decrease the volume of chamber 18 and apply fluid under pressure to the front-wheel brakes 34 via conduit 31. Since the forces applied to pistons 7 and 8 are equal, the pressure within chambers 18 and 19 rises in inverse proportion to the ratio of their effective surface area, the front-wheel brakes 34 thereby being actuated under greater braking pressure. During relative movement between piston 7 and 8, any fluid within chamber 14 is expelled through passage 30 into the reservoir 50 and thus does not impede the relative displacement of the pistons. Since ports 11 and 12 are blocked at the outset, there is no danger that the front-wheel brakes will lock excessively or be "overbraked."

The invention as described and illustrated is believed to admit of many modifications within the ability of persons skilled in the art, all such modifications being considered within the spirit and scope of the appended claims.

What is claimed is:

1. A brake master cylinder, comprising housing means forming a generally cylindrical bore and provided with a pair of outlets axially spaced therealong for feeding fluid to respective brake means; a floating piston reciprocable within said bore intermediate said outlets, said floating piston having an axially extending chamber open at one end thereof; and an actuating piston reciprocable within said bore and having a portion axially extending into said chamber through the open end of said floating piston and slidably received therein, said floating piston being provided with means forming with the wall of said bore a passage communicating between the exterior thereof and said chamber, one of said outlets being disposed intermediate said pistons, said housing means including a fluid reservoir containing fluid at a low pressure, said passage communicating with said reservoir and including a port formed in a wall of said floating piston and interconnecting said bore and said chamber.

2. A brake master cylinder, comprising housing means forming a generally cylindrical bore and provided with a pair of outlets axially spaced therealong for feeding fluid to respective brake means; a floating piston reciprocable within said bore intermediate said outlets, said floating piston having an axially extending chamber open at one end thereof; an actuating piston reciprocable within said bore and having a portion axially extending into said chamber through the open end of said floating piston and slidably received therein, said floating piston being provided with means forming with the wall of said bore a passage communicating between the exterior thereof and said chamber, one of said outlets being disposed intermediate said pistons; and prestressed resilient means yieldably interposed between said pistons within said chamber, said housing means including a fluid reservoir containing fluid at a low pressure, said passage communicating with said reservoir and including a port formed in a wall of said floating piston and interconnecting said bore and said chamber.

3. A brake master cylinder, comprising housing means forming a generally cylindrical bore and provided with a pair of outlets axially spaced therealong for feeding fluid to respective brake means; a floating piston reciprocable within said bore intermediate said outlets, said floating piston having an axially extending chamber open at one end thereof; and a mechanically displaceable actuating piston reciprocable within said bore and having a portion axially extending into said chamber through the open end of said floating piston and slidably received therein, said floating piston being provided with means forming with the wall of said bore a passage communicating between the exterior thereof and said chamber, one of said outlets being disposed intermediate said pistons; and restoring means bearing upon said actuating piston in a direction opposite the direction of mechanical displacement, said housing means including a fluid reservoir containing fluid at a low pressure, said passage communicating with said reservoir and including a port formed in a wall of said floating piston and interconnecting said bore and said chamber.

4. A brake master cylinder, comprising housing means forming a generally cylindrical bore and provided with a pair of outlets axially spaced therealong for feeding fluid to respective brake means; a floating piston reciprocable within said bore intermediate said outlets, said floating piston having an axially extending chamber open at one end thereof; a mechanically displaceable actuating piston reciprocable within said bore and having a portion axially extending into said chamber through the open end of said floating piston and slidably received therein, said floating piston being provide with means forming with the wall of said bore a passage communicating between the exterior thereof and said chamber, one of said outlets being disposed intermediate said pistons, restoring means bearing upon said actuating piston in a direction opposite the direction of mechanical displacement; and prestressed resilient means yieldably interposed between said pistons within said chamber, said housing means including a fluid reservoir containing fluid at a low pressure, said passage communicating with said reservoir and including a port formed in a wall of said floating piston and interconnecting said bore and said chamber.

5. A brake master cylinder, comprising housing means forming a generally cylindrical bore and provided with a pair of outlets axially spaced therealong for feeding fluid to respective brake means; a floating piston reciprocable within said bore intermediate said outlets, said floating piston having an axially extending chamber open at one end thereof; a mechanically displaceable actuating piston reciprocable within said bore and having a portion axially extending into said chamber through the open end of said floating piston and slidably received therein, said actuating piston having an effective fluid compression area less that of said floating piston, said floating piston being provided with means forming with the wall of said bore a passage communicating between the exterior thereof and said chamber, one of said outlets being disposed intermediate said pistons, restoring means bearing upon said actuating piston in a direction opposite the direction of mechanical displacement whereby the brake means associated with said actuating piston is operated with a fluid pressure exceeding that applied to the brake means associated with said floating piston; and prestressed resilient means yieldably interposed between said pistons within said chamber, said housing means including a fluid reservoir containing fluid at a low pressure, said passage communicating with said reservoir and including a port formed in a wall of said floating piston and interconnecting said bore and said chamber.

6. A brake master cylinder, comprising housing means forming a generally cylindrical bore, a floating piston and an actuating piston telescopingly received in said floating piston slidably mounted in said bore for relative and joint axial displacement therein, and prestressed resilient means yieldably resisting displacement of said actuating piston into said floating piston, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between the exterior of said housing means and said chamber for maintaining the fluid pressure therewithin below that at said outlets upon displacement of said pistons, said housing means including a fluid reservoir containing fluid at a low pressure, said passage communicating with said reservoir and including a port formed in a wall of said floating piston and interconnecting said bore and said chamber.

7. A brake master cylinder, comprising housing means forming a generally cylindrical bore, a floating piston and an actuating piston telescopingly received in said floating piston slidably mounted in said bore for relative and joint axial displacement therein, and prestressed resilient means yieldably resisting displacement of said actuating piston into said floating piston, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between the exterior of said housing means and said chamber for maintaining the fluid pressure therewithin below that at said outlets upon displacement of said pistons, said prestressed resilient means including a coil spring bearing under compression upon said pistons within said chamber in a sense tending to increase the volume thereof, said housing means including a fluid reservoir containing fluid at a low pressure, said passage communicating with said reservoir and including a port formed in a wall of said floating piston and interconnecting said bore and said chamber.

8. A brake master cylinder, comprising housing means forming a generally cylindrical bore; a floating piston and an actuating piston telescopingly received in said floating piston slidably mounted in said bore for relative and joint axial displacement therein; prestressed resilient means yieldably resisting displacement of said actuating piston into said floating piston, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads; and axially spaced annular seal means on said one of said pistons defining between them an annular compartment within said bore, one of said pistons being provided with a port opening into said compartment from the interior of said floating piston, said housing means being provided with an opening communicating between the exterior thereof and said compartment.

9. A brake master cylinder, comprising housing means forming a generally cylindrical bore; a floating piston and an actuating piston telescopingly received in said floating piston slidably mounted in said bore for relative and joint axial displacement therein; prestressed resilient means yieldably resisting displacement of said actuating piston into said floating piston, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between the exterior of said housing means and said chamber for maintaining the fluid pressure therewithin below that at said outlets upon displacement of said pistons, said prestressed resilient means including a coil spring bearing under compression upon said pistons within said chamber in a sense tending to increase the volume thereof; and axially spaced annular seal means on said one of said pistons defining between them an annular compartment within said bore, said passage opening into said compartments, said housing means being provided with an opening communicating between the exterior thereof and said compartment.

10. A vehicular brake system, comprising fluid-responsive front-wheel brake means; fluid-responsive rear-wheel brake means, said front-wheel and rear-wheel brake means having different fluid-pressure requirements; a reservoir for brake fluid; a brake master cylinder for supplying fluid to said brake means, said master cylinder including housing means forming a generally cylindrical bore, a floating piston and an actuating piston telescopingly received in said floating piston slidably mounted in said bore for relative and joint axial displacement therein, said actuating piston being stepped and having a small head sealingly slidable in said floating piston and defining therein a chamber, and prestressed resilient means in said chamber yieldably resisting displacement of said actuating piston into said floating piston, said housing means being formed with inlet means blockable by said pistons for supplying fluid to said bore, said actuating piston having a large head sealingly engaging the wall of said bore but defining a relatively small effective fluid-pressurizing surface, said floating piston sealingly engaging the wall of said bore and defining a relatively large effective fluid-pressurizing surface within said bore, said housing means being provided with first and second outlets respectively ahead of said effective surfaces of said actuating and floating pistons for supplying fluid under pressure to independently operable loads; and first conduit means for connecting said first outlet with said front-wheel brake means and second conduit means for connecting said second outlet with said rear-wheel brake means.

11. A vehicular brake system, comprising front-wheel brake means; rear-wheel brake means; a reservoir for brake fluid; a brake master cylinder for supplying fluid to said brake means, said master cylinder including housing means forming a generally cylindrical bore, a floating piston and an actuating piston telescopingly received in said floating piston slidably mounted in said bore for relative and joint axial displacement therein, and prestressed resilient means yieldably resisting displacement of said actuating piston into said floating piston, said housing means being formed with inlet means blockable by said pistons for supplying fluid to said bore, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between said reservoir and said chamber for maintaining the fluid pressure therewithin below that at said outlets upon displacement of said pistons; and first conduit means for connecting said first outlet with said front-wheel brake means and second conduit means for connecting said second outlet with said rear-wheel brake means.

12. A vehicular brake system, comprising front-wheel brake means; rear-wheel brake means; a reservoir for brake fluid; a brake master cylinder for supplying fluid to said brake means, said master cylinder including housing means forming a generally cylindrical bore, a floating piston and an actuating piston telescopingly received in said floating piston slidably mounted in said bore for relative and joint axial displacement therein, and prestressed resilient means yieldably resisting displacement of said actuating piston into said floating piston, said housing means being formed with inlet means blockable by said pistons for supplying fluid to said bore, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between said reservoir and said chamber for maintaining the fluid pressure therewithin below that of said outlets upon displacement of said piston, said prestressed resilient means including a coil spring bearing under compression upon said pistons within said chamber in a sense tending to increase the volume thereof; and first conduit means for connecting said first outlet with said front-wheel brake means and second conduit means for connecting said second outlet with said rear-wheel brake means.

13. A vehicular brake system, comprising front-wheel brake means; rear-wheel brake means, a reservoir for brake fluid; a brake master cylinder for supplying fluid to said brake means, said master cylinder including housing means forming a generally cylindrical bore, a floating piston and an actuating piston telescopingly received in said floating piston slidably mounted in said bore for relative and joint axial displacement therein, and prestressed resilient means yieldably resisting displacement of said actuating piston into said floating piston, said housing means being formed with inlet means blockable by said pistons for supplying fluid to said bore, said actuating piston being formed with a relatively small effective fluid-pressurizing surface and said floating piston being formed with a relatively large effective fluid-pressurizing surface within said bore, said housing means being provided with first and second outlets respectively ahead of said effective surfaces of said actuating and floating pistons for supplying fluid under pressure to independently operable loads, said floating piston and said actuating piston forming between them a chamber of variable volume, one of said pistons being provided with a passage communicating between said reservoir and said chamber for maintaining the fluid pressure therewithin below that of said outlets upon displacement of said piston, said prestressed resilient means including a coil spring bearing under compression upon said pistons within the chamber in a sense tending to increase the volume thereof, axially spaced annular seal means on said one of said pistons defining between them an annular compartment within said bore, said passage opening into said compartment, said housing means being provided with an opening communicating between said reservoir and said compartment; and first conduit means for connecting said first outlet with said front-wheel brake means and second conduit means for connecting said second outlet with said rear-wheel brake means.

References Cited by the Examiner
UNITED STATES PATENTS
3,149,468  9/1964  Shutt _____ 60—54.6

MARTIN P. SCHWADRON, Primary Examiner.
ROBERT R. BUNEVICH, JULIUS E. WEST,
Examiners.